(12) United States Patent
Huang (10) Patent No.: US 7,350,767 B2
(45) Date of Patent: Apr. 1, 2008

(54) STRAPPING APPARATUS

(76) Inventor: Han-Ching Huang, No. 12, Alley 111, Lane 437, Chen Hsing Road, Taichung (TW)

( * ) Notice: Subject to any disclaimer, the term of this patent is extended or adjusted under 35 U.S.C. 154(b) by 78 days.

(21) Appl. No.: 11/306,431

(22) Filed: Dec. 28, 2005

(65) Prior Publication Data

US 2006/0197072 A1    Sep. 7, 2006

Related U.S. Application Data

(63) Continuation-in-part of application No. 10/906,717, filed on Mar. 3, 2005, now abandoned.

(51) Int. Cl.
*B21F 9/00* (2006.01)

(52) U.S. Cl. ............ 254/218; 254/223; 254/239; 410/100; 410/103; 24/68 CD (58) Field of Classification Search ......... 254/217, 254/218, 223, 375, 326, 382, 238, 239; 242/388.1–388.7, 242/532.6, 546.1, 396.6; 410/100, 103; 24/68 CD, 24/68 BT, 199
See application file for complete search history.

(56) References Cited

U.S. PATENT DOCUMENTS 5,560,086 A    10/1996  Huang ............... 24/68 CD 6,007,053 A    12/1999  Huang ............... 254/247
6,102,371 A     8/2000  Wyers ............... 254/218
6,547,218 B2 *  4/2003  Landy ............... 254/217
6,609,275 B1    8/2003  Lin
6,641,116 B1   11/2003  Huang ............... 254/218

* cited by examiner

*Primary Examiner*—Emmanuel M Marcelo
(74) *Attorney, Agent, or Firm*—Alan Kamrath; Kamrath & Associates PA (57) ABSTRACT

A strapping apparatus includes a frame. A first strap is connected to the frame. An axle is installed on the frame. A second strap is connected to the axle. A spool is positioned around the axle. The spool defines a slit through which the second strap is directed. Two ratchets are connected to the spool and rotationally installed on the axle. A coil spring includes a first end connected to the axle and a second end connected to the frame in order to rotate the spool. A first detent is movable on the frame between an operative position in engagement with the ratchets and an idle position away from the ratchets. A handle is pivotally installed on the axle. A second detent is movable on the handle between an operative position in engagement with the ratchets in order to rotate the spool and an idle position away from the ratchets.

22 Claims, 8 Drawing Sheets

STRAPPING APPARATUS

CROSS-REFERENCE the present patent application is a continuation-in-part application of U.S. patent application Ser. No. 10/906,717 filed Mar. 3, 2005 now abandoned.

BACKGROUND OF INVENTION

Field of Invention

The present invention relates to a strapping apparatus with an automatic strap-reeling device.

Figure 1:
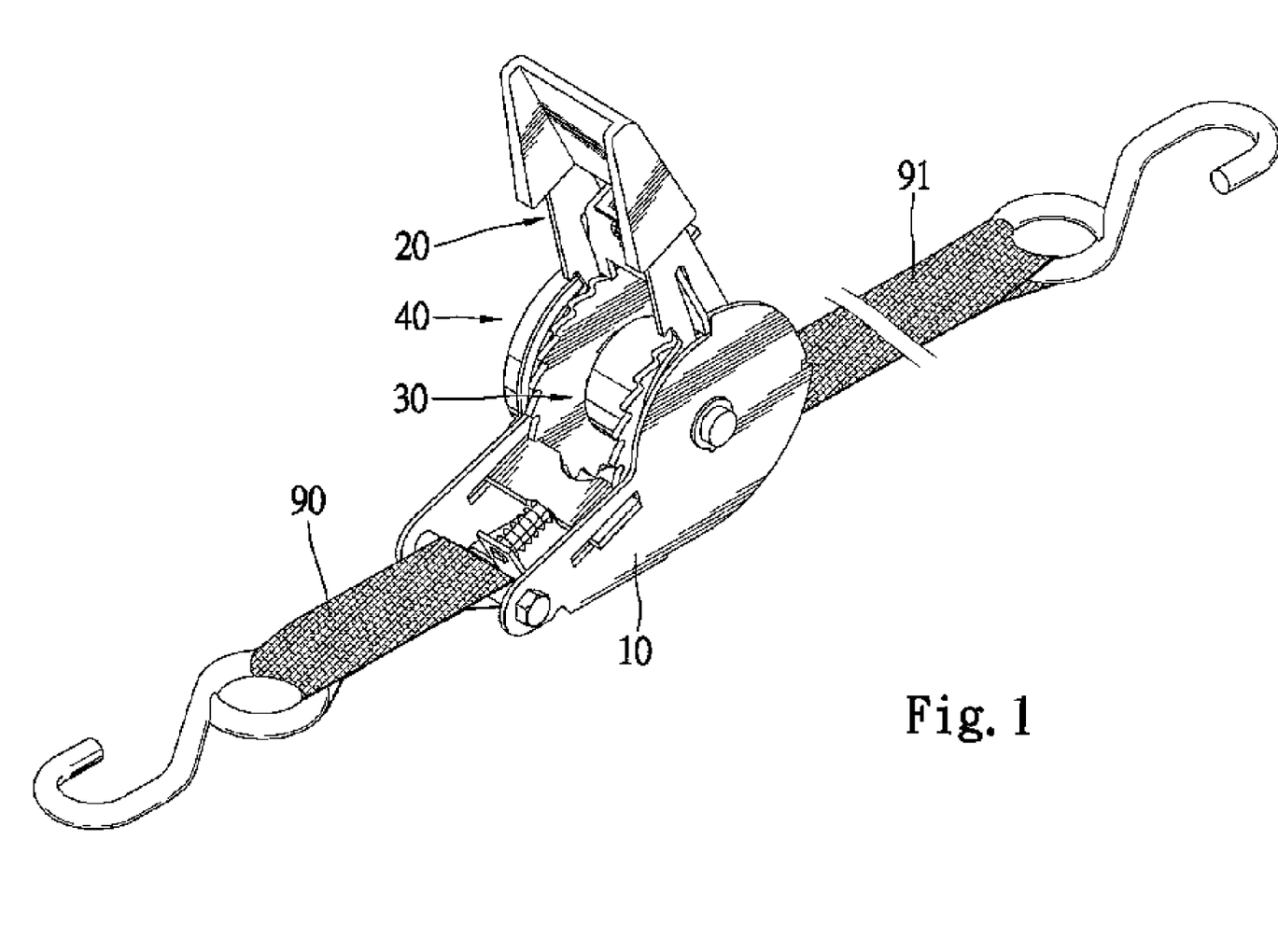
FIG. 1 is a perspective view of a strapping apparatus according to the preferred embodiment of the present invention.

Referring to FIG. 1, according to the preferred embodiment of the present invention, a strapping apparatus includes a frame 10, a handle 20, a ratchet 32 and spool device 30 and an automatic reeling device 40.

Disclosed in U.S. Pat. No. 5,560,086 is a strapping mechanism having a safety device. This conventional strapping mechanism includes a base arm 10, an operating arm 20 and a shaft 30 for pivotally connecting the operating arm 20 to the base arm 10. A stop 11 is movable on the base arm 10. A catch 21 is movable on the operating arm 20. Two ratchets 31 are installed on the shaft 30. A strap is wound on the shaft 30. If the operating arm 20 is pivoted on the base arm 10 in a first direction, the catch 21 will engage with the ratchets 31 in order to rotate the shaft 30, thus reeling in the strap. If the operating arm 20 is pivoted on the base arm 10 in a second direction opposite to the first direction, the catch 21 will rattle on the ratchet gears 31 without rotating the shaft 30. Meanwhile, the stop 11 will engage with the ratchets 31, thus holding the shaft 30 and preventing the strap from reeling out. The base arm 10 includes two parallel members each defining a recess 15. The operating arm 20 includes two parallel members between which a reinforcing rod 23 is provided. The reinforcing rod 23 is essential for providing adequate rigidity to the operating arm 20. When the operating arm 20 is positioned against the base arm 10, the reinforcing rod 23 is positioned in the recesses 15. A problem with this conventional strapping apparatus is incapability of reeling in the strap automatically. A user has to reel in the strap after use, and this is inconvenient. The user often leaves the strap unreeled in a hurry. The strap often gets entangled, and causes inconvenience in further use. Another problem with this conventional strapping apparatus is the reinforcing rod 23 bumping the members of the base arm 10. This might cause damages to parts and slack of parts.

Disclosed in U.S. Pat. No. 6,007,053 is a retractable tie-down assembly with fine tightness adjustment. This conventional tie-down assembly includes a frame 10, a spool 20, an axle 30 through which the spool 20 is installed on the frame 10, a holder bracket 40 installed on the frame 10 by means of the axle 30 and a coil spring 81 provided between the spool 20 and the axle 30. The spool 20 includes two end walls 22 in the form of a ratchet. A pawl member 50 is movable on the holder bracket 40. Two springs 512 and two more springs 521 are provided between the pawl member 50 and the holder bracket 40. A catch 60 is movable on the frame 10. A press plate 70 is connected to the catch 60. A spring 421 is provided between the press plate 70 and the holder bracket 40. A problem with this conventional tie-down assembly is the numerous parts. This large number of parts involves difficult assembly, and entails a high cost. The installment of the springs 421, 512 and 521 is particularly troublesome. Another problem with this convention tie-down assembly is the complicated structure. Another problem with this conventional strapping apparatus is the holder bracket 40 bumping the frame. This might cause damages to parts and slack of parts.

The present invention is intended to obviate or at least alleviate the problems encountered in prior art.

SUMMARY OF INVENTION

According to the present invention, a strapping apparatus includes a frame. A first strap is connected to the frame. An axle is installed on the frame. A second strap is connected to the axle. A spool is positioned around the axle. The spool defines a slit through which the second strap is directed. Two ratchets are connected to the spool and rotationally installed on the axle. A coil spring includes a first end connected to the axle and a second end connected to the frame in order to rotate the spool. A first detent is movable on the frame between an operative position in engagement with the ratchets and an idle position away from the ratchets. A handle is pivotally installed on the axle. A second detent is movable on the handle between an operative position in engagement with the ratchets in order to rotate the spool and an idle position away from the ratchets.

The primary advantage of the strapping apparatus of the present invention is its simple structure.

Other advantages and features of the invention will become apparent from the following description in conjunction with the attached drawings.

BRIEF DESCRIPTION OF DRAWINGS

The present invention will be described through detailed illustration of the preferred embodiment referring to the drawings.

DETAILED DESCRIPTION OF PREFERRED EMBODIMENT

Referring to FIG. 1, according to the preferred embodiment of the present invention, a strapping apparatus includes a frame 10, a handle 20, a ratchet and spool device 30 and an automatic reeling device 40.

Figure 2:
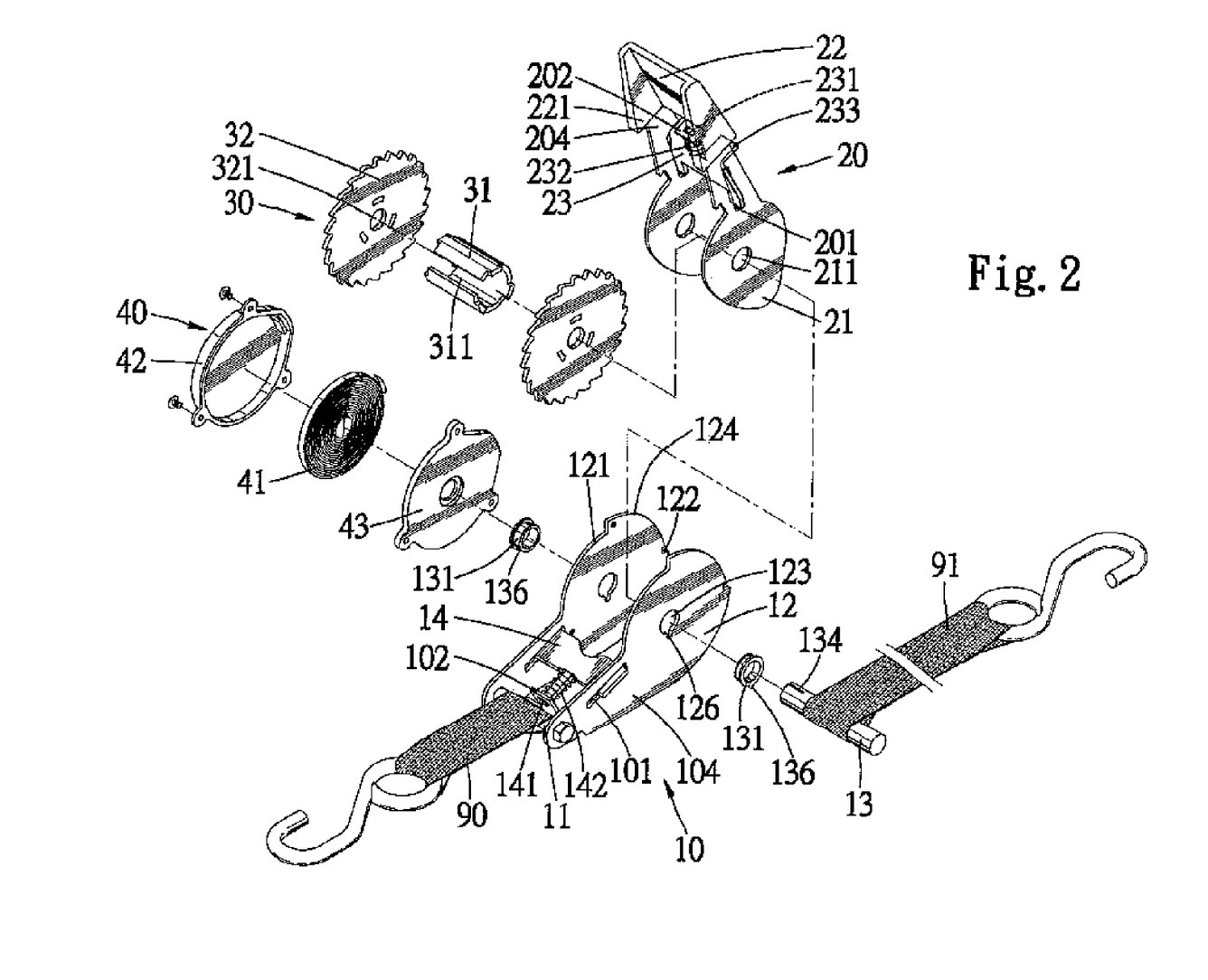
FIG. 2 is an exploded view of the strapping apparatus shown in FIG. 1.
Figure 3:
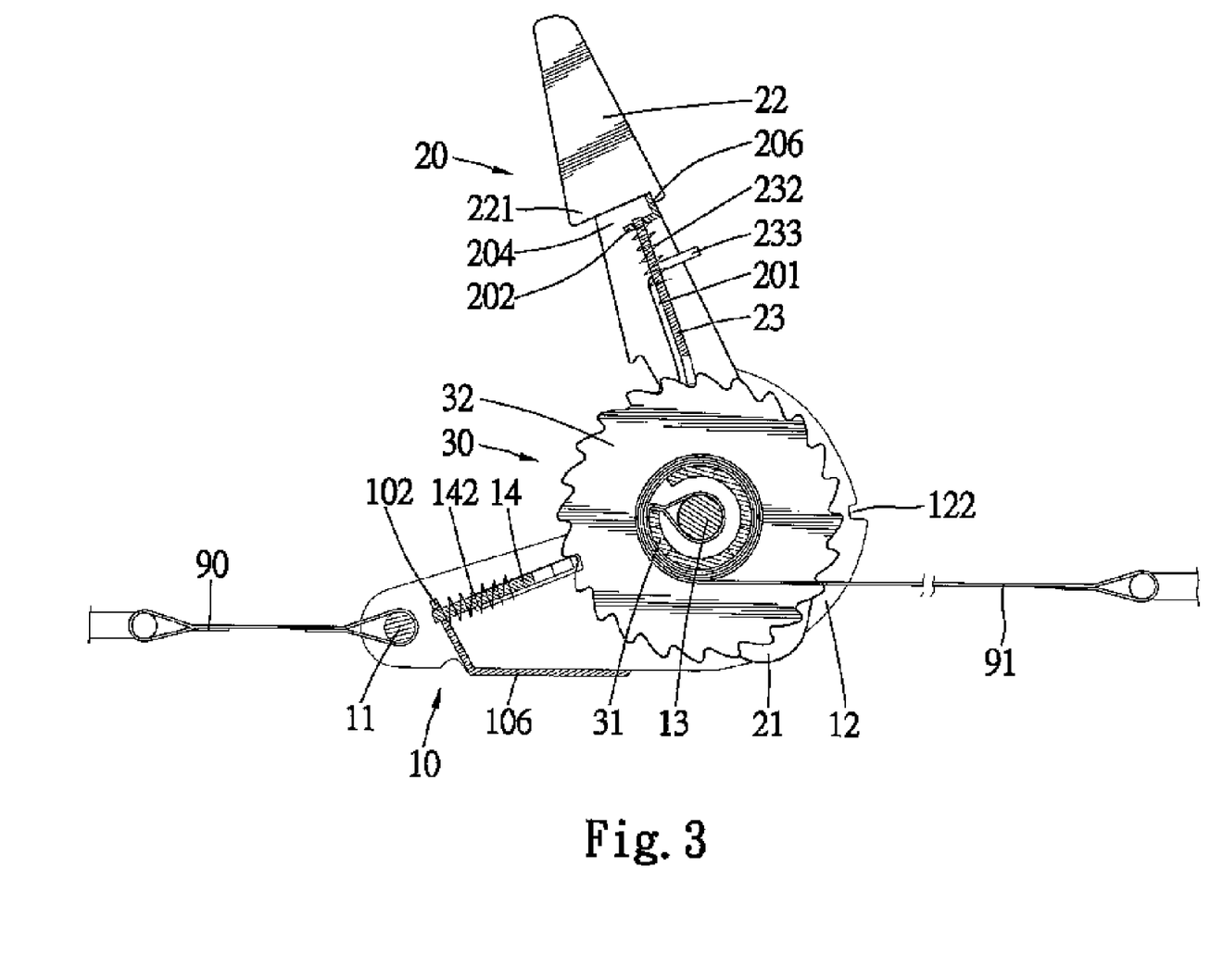
FIG. 3 is a cross-sectional view of the strapping apparatus shown in FIG. 1.
Figure 4:
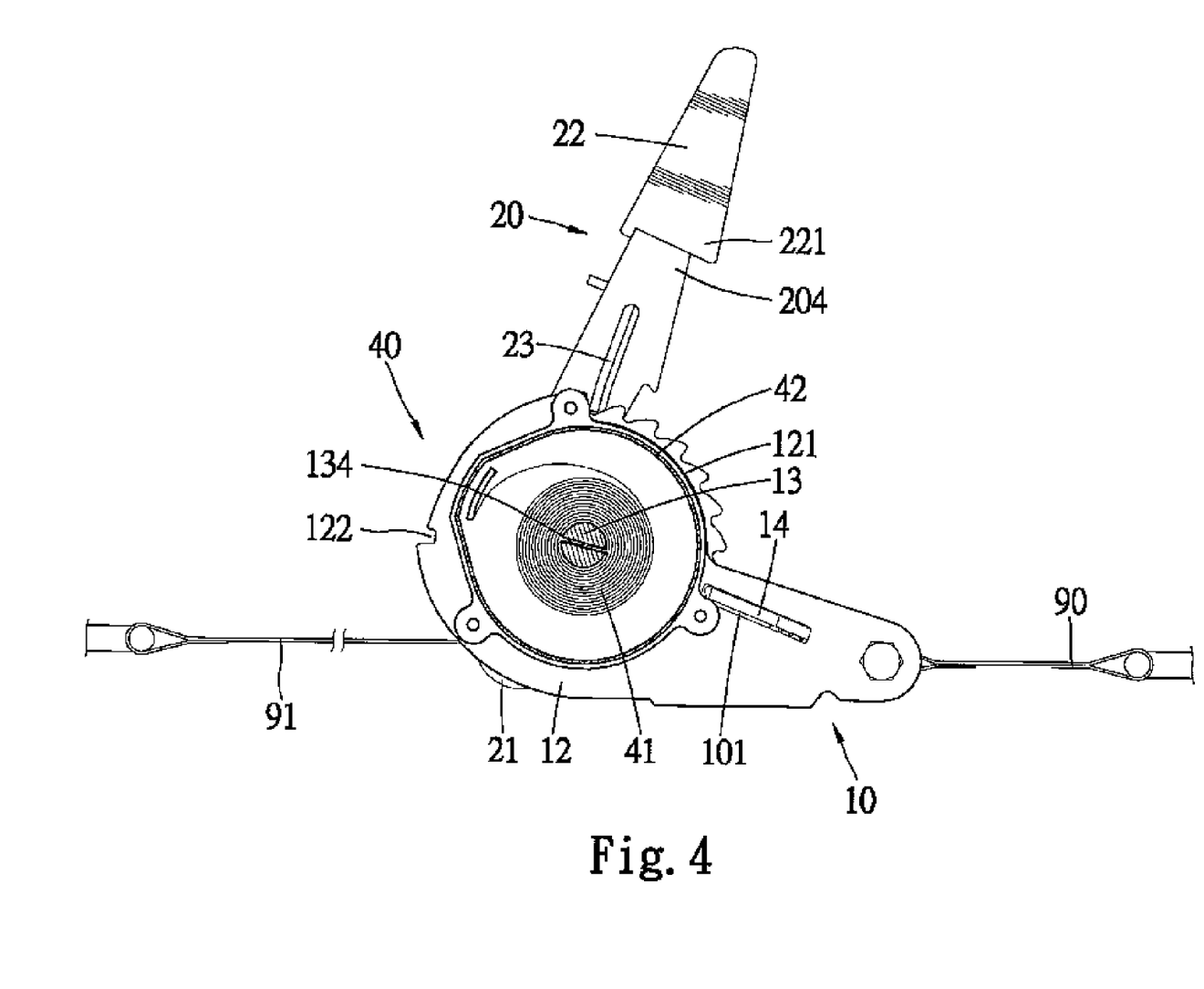
FIG. 4 is another cross-sectional view of the strapping apparatus shown in FIG. 1.

Referring to FIGS. 2 through 4, the frame 10 includes two parallel lateral members 104 and an intermediate member 106 between the lateral members 104. Each of the lateral members 104 includes a first end, a second end and a middle section. Each of the lateral members 104 includes a slot 101 in the middle section and a disc 12 at the second end.

Each of the discs 12 includes an aperture 123 therein, a cutout 126 in communication with the aperture 123, a first arched edge 121 thereon, a second arched edge 124 thereon and a recess 122 in the second arched edge 124. Measured from a center of the aperture 123, the radius of the first arched edge 121 is shorter than that of the second arched edge 124. A stop 102 is formed on the intermediate member 106.

The first ends of the lateral members 104 are connected to each other by means of a crossbar 11. A first strap 90 is fastened to the crossbar 11.

A first detent 14 includes two ends movable in the slots 101 and a rod 141 movable in an aperture in the stop 102. Thus, the first detent 14 is smoothly movable on the frame 10. A spring 142 is positioned around the rod 141. The spring 142 is compressed between the first detent 14 and the stop 102 in order to move the first detent 14 toward the spool device 30.

An axle 13 includes two ends inserted through the apertures 123 of the lateral members 104. In the preferred embodiment, each of the ends of the axle 13 is installed on a bearing 131. Each of the bearings 131 is formed with a boss 136 fit in the cutout 126. Thus, the bearings 131 do rotate on the discs 12. One of the ends of the axle 13 defines a slit 134. A second strap 91 includes, at an end, a loop around the axle 13.

The handle 20 includes two lateral members 204 and a grip 206 between the lateral members 204. Each of the lateral members 204 includes a first end, a second end and a middle section. Each of the lateral members 204 includes a cam 21 at the first end, an aperture 211 in the cam 21 and slot 201 in the middle section.

The apertures 211 receive the ends of the axle 13 in order to pivotally install the handle 20 on the axle 13. Thus, as the handle 20 is pivoted on the frame 10, the cams 21 are brought into contact with the ends of the first detent 14.

The grip 206 is formed between the second ends of the lateral members 204. A stop 202 is formed on a side of the grip 206.

A second detent 23 includes two ends movable in the slots 201 and a rod 231 inserted through an aperture in the stop 202 so that the second detent 23 is smoothly movable on the handle 20. As the handle 20 is pivoted on the frame 10, the ends of the second detent 23 slide on the first arched edges 121 or the second arched edges 124 of the discs 12.

A spring 232 is positioned around the rod 231. The spring 232 is compressed between the second detent 23 and the stop 202 so as to push the second detent 23 toward the ratchet 32 and spool device 30. The second detent 23 includes a tab 233 thereon. A user can move the second detent 23 by the tab 233.

The grip 206 is covered by means of a grip cover 22. The grip cover 22 is made of a soft material, and hence will not hurt the user. The grip cover 22 includes two soft contacts 221 thereon. As the handle 20 is positioned against the frame 10, the soft contacts 221 are in contact with the first ends of the lateral members 104. Thus, the handle 20 does not contact the frame 10 directly, thus avoiding damages.

The ratchet 32 and spool device 30 includes a spool 31 and two ratchets 32. The spool 31 defines a slit 311 between two ends. The spool 31 is positioned around the axle 13. The second strap 91 is directed through the slit 311. The ratchets 32 are for engagement with the second detent 23. Each of the ratchets 32 is attached to related one of the ends of the spool 31. The ratchets 32 are rotationally installed on the axle 13. Each ratchet 32 has an aperture 321 in the center.

The automatic reeling device 40 includes a coil spring 41 and a case. The case includes a first cover 42 and a second cover 43. The case is attached to one of the discs 12. The coil spring 41 includes an end fit in the slit 134 of the axle 13 and another end hooked to a tab on the first cover 42.

In use, the user moves the first detent 14 in order to disengage the ends of the first detent 14 from the ratchets 32. Then, the user reels out the second strap 91. The coil spring 41 is loaded. The user fastens the first strap 90 and the second strap 91. The user keeps the first detent 14 disengaged from the ratchets 32. The coil spring 41 rotates the axle 13 that rotates the spool 31 through the second strap 91, thus tightening the first strap 90 and the second strap 91.

Figure 5:
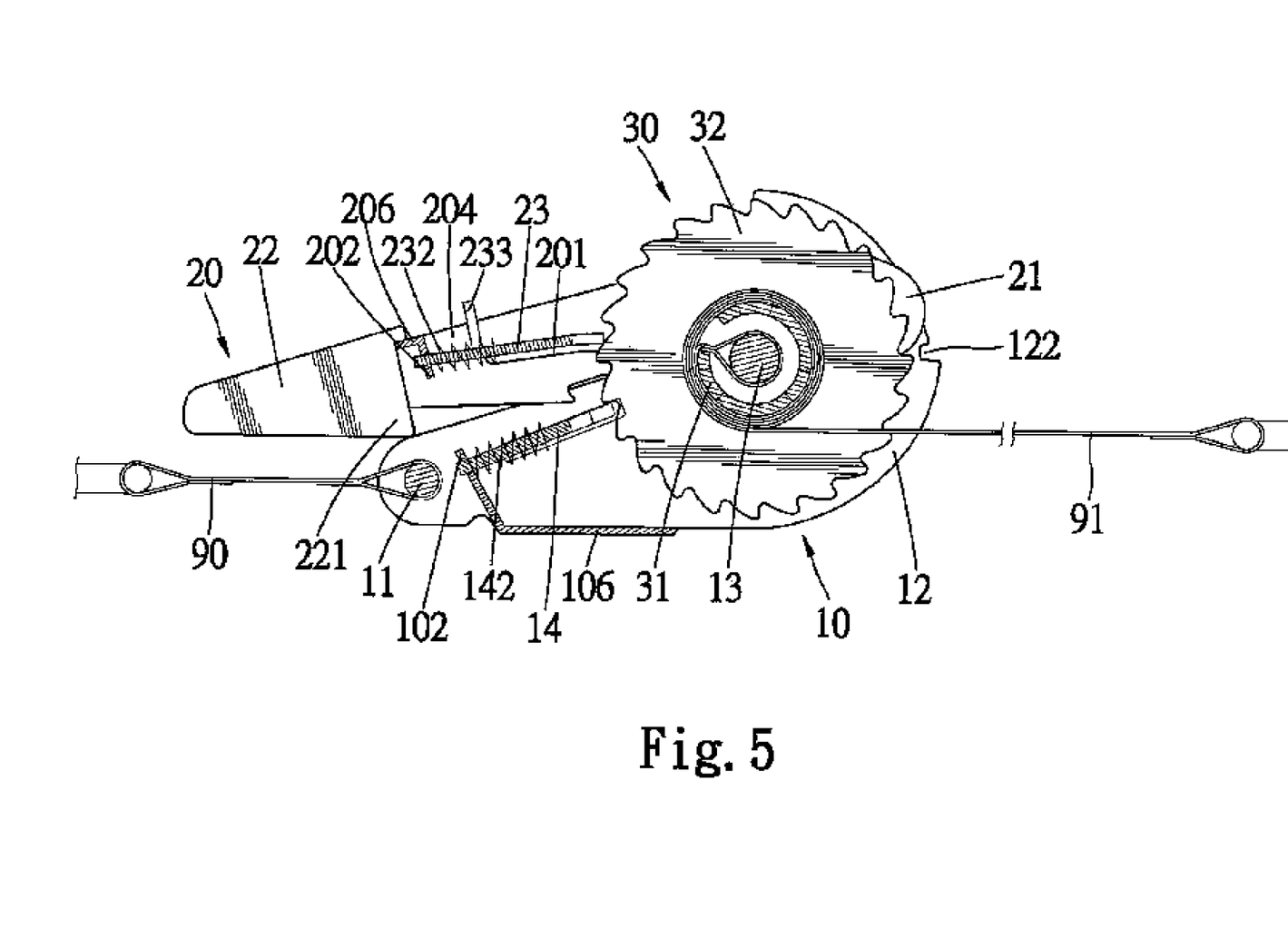
FIG. 5 is a cross-sectional view of the strapping apparatus in another position than shown in FIG. 3.

Referring to FIG. 5, to further tighten the first strap 90 and the second strap 91, the user pivots the handle 20 to the frame 10, with the second detent 23 rattling on the ratchets 32. The soft contacts 221 contact the frame 10. The handle 20 does not contact the frame 10.

Figure 6:
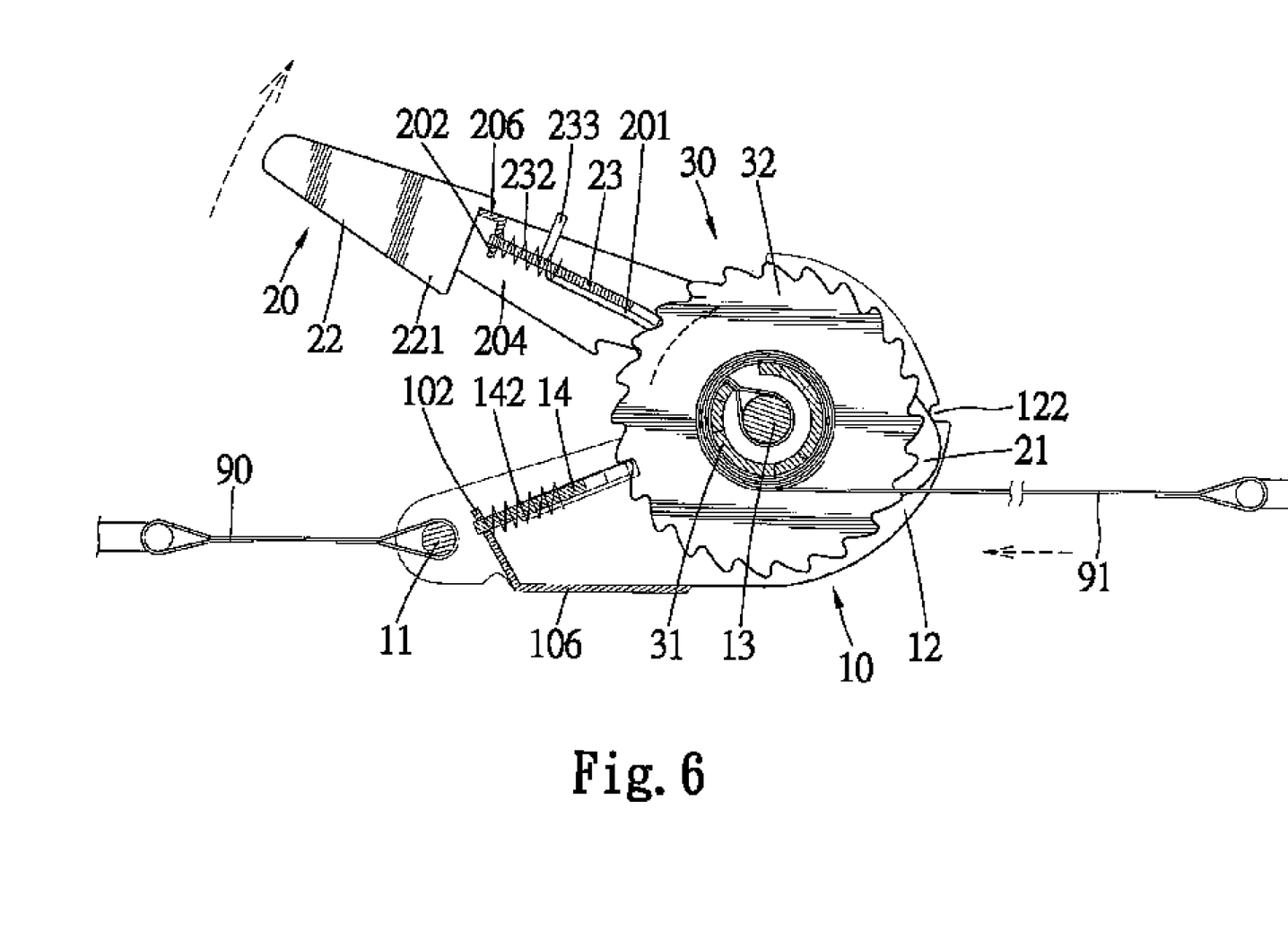
FIG. 6 is a cross-sectional view of the strapping apparatus in another position than shown in FIG. 5.

Referring to FIG. 6, the user pivots the handle 20 from the frame 10. With the second detent 23 in engagement with the ratchets 32, the user rotates the ratchets 32 and the spool 31, and reel in the second strap 91. Hence, the user tightens the first strap 90 and the second strap 91.

Figure 7:
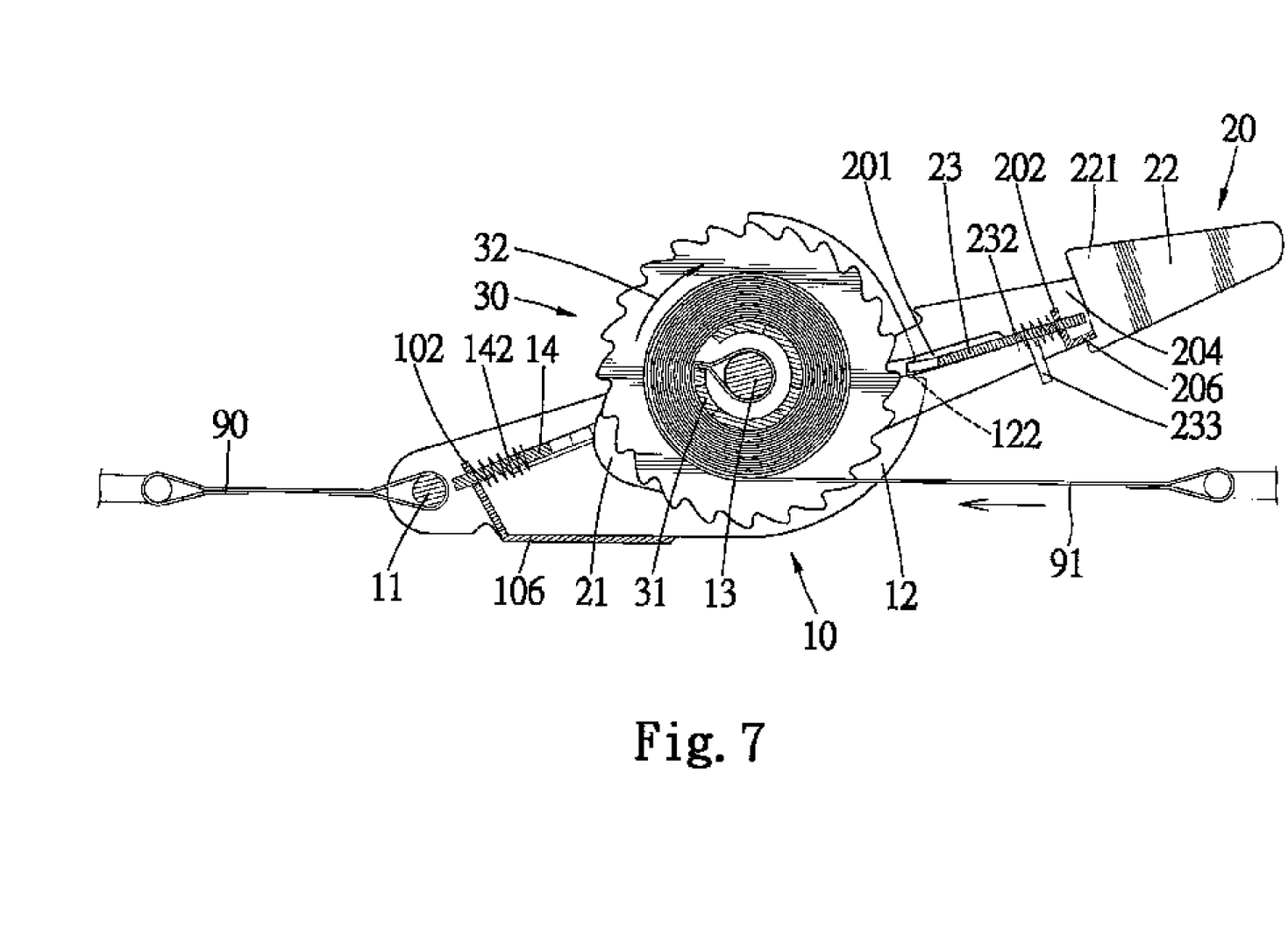
FIG. 7 is a cross-sectional view of the strapping apparatus in another position than shown in FIG. 4.
Figure 8:
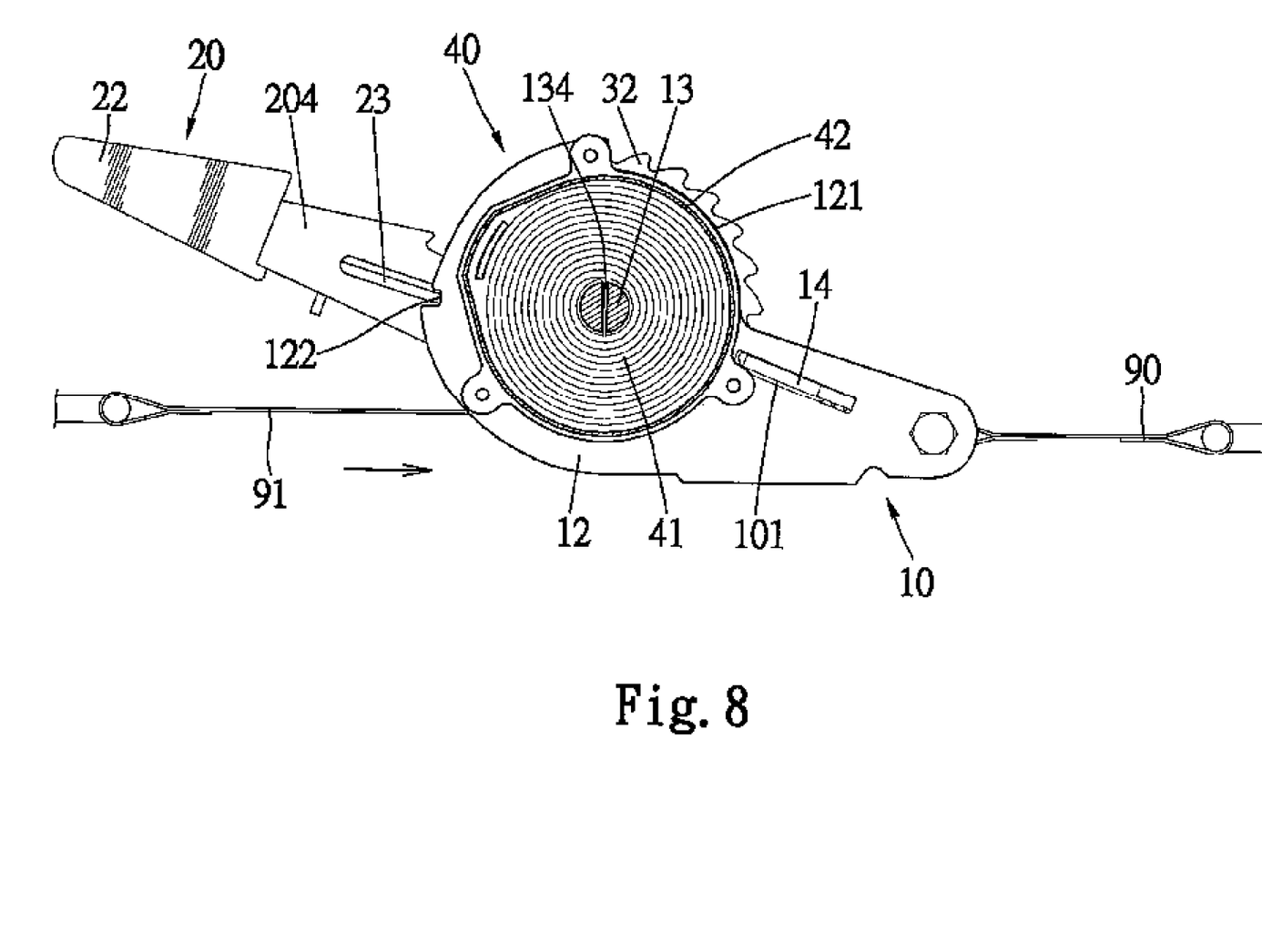
FIG. 8 is a cross-sectional view of the strapping apparatus in another position than shown in FIG. 7.

Referring to FIGS. 7 and 8, to reel in the second strap 91, the user pivots the handle 20 from the frame 10 until the second detent 23 reaches the ends of the first arched edges 121. By the tab 233, the user moves the detents 23 from the first arched edges 121 to the second arched edges 124. The user continues to pivot the handle 20, with the second detent 23 sliding on the second arched edges 124. Finally, the user moves the ends of the second detent 23 into the recesses 122, thus keeping the second detent 23 from the ratchets 32. Meanwhile, the cams 21 push the ends of the first detent 14, thus disengaging the first detent 14 from the ratchets 32. Now, the coil spring 41 rotates the axle 13 that rotates the spool 31 through the second strap 91 so that the spool 31 reels in the second strap 91.

The present invention has been described through illustration of the preferred embodiment. Those skilled in the art can derive variations from the preferred embodiment without departing from the scope of the present invention. Therefore, the preferred embodiment shall not limit the scope of the present invention defined in the claims.

What is claimed is:

1. A strapping apparatus comprising:
   a frame including two lateral members;
   a first strap connected to the frame;
   an axle installed on the frame and supported by the lateral members of the frame;
   a second strap connected to the axle;
   a spool positioned around the axle, the spool defines a slit through which the second strap is directed;
   two ratchets connected to the spool and rotationally installed on the axle;
   a coil spring comprising a first end connected to the axle and a second end connected to the frame in order to rotate the spool;
   a first detent movably installed on the frame between an operative position in engagement with the ratchets and an idle position away from the ratchets;
   a handle pivotally installed on the axle, with the handle having two cams spaced from each other and extending from the handle;
   a second detent movably installed on the handle between an operative position in engagement with the ratchets in order to rotate the spool and an idle position away from the ratchets, wherein the second detent engages the two lateral members on exterior sides of the handle opposite to the ratchets;

wherein each of the two lateral members of the frame comprises a disc on which the axle rests and the second detent slides, with the ratchets intermediate the discs, with each cam located between one of the ratchets and one of the discs of the two lateral members, with each disc comprising:

a first arched edge, with the second detent slideable on the first arched edge; and a second arched edge adjacent to the first arched edge, with the second arched edge having a longer radius than the first arched edge in order to keep the second detent from the ratchets;

wherein the second arched edge of the disc of each of the lateral members of the frame has a longer radius than the ratchets.

2. The strapping apparatus according to claim 1 comprising a cover attached to the frame in order to cover the coil spring.

3. The strapping apparatus according to claim 2 wherein the first end of the coil spring is attached to the cover.

4. The strapping apparatus according to claim 1 wherein the frame comprises an intermediate member between the lateral members.

5. The strapping apparatus according to claim 4 comprising a compression spring between the intermediate member of the frame and the first detent.

6. The strapping apparatus according to claim 5 wherein the intermediate member of the frame comprises a stop against the compression spring.

7. The strapping apparatus according to claim 6 wherein the first detent comprises a rod inserted in an aperture in the stop.

8. The strapping apparatus according to claim 7 wherein the rod is inserted in the compression spring.

9. The strapping apparatus according to claim 1 wherein the second arched edge of the disc of each of the lateral members of the frame defines a recess for receiving the second detent.

10. The strapping apparatus according to claim 1 wherein each of the lateral members of the frame defines a slot in which an end of the first detent is movable.

11. The strapping apparatus according to claim 1 wherein the handle comprises two handle lateral members and a grip between the handle lateral members, with the cams connected to the handle lateral members opposite to the grip.

12. The strapping apparatus according to claim 11 comprising a compression spring between the grip and the second detent.

13. The strapping apparatus according to claim 12 wherein the grip comprises a stop against the compression spring.

14. The strapping apparatus according to claim 13 wherein the second detent comprises a rod inserted in an aperture in the stop.

15. The strapping apparatus according to claim 14 wherein the rod is inserted in the compression spring.

16. The strapping apparatus according to claim 11 comprising a grip cover for covering the grip.

17. The strapping apparatus according to claim 16 wherein the grip cover comprises at least one soft contact for contact with the frame.

18. The strapping apparatus according to claim 1 wherein the second detent comprises a tab for facilitating the movement thereof.

19. The strapping apparatus according to claim 1 comprising two bearings for bearing two ends of the axle on the discs.

20. The strapping apparatus according to claim 19 wherein each of the discs defines an aperture in order to receive an end of the axle.

21. The strapping apparatus according to claim 20 comprising two bearings each positioned in the aperture defined in related one of the discs.

22. The strapping apparatus according to claim 21 wherein each of the bearings includes a boss thereon, wherein each of the discs defines a cutout for receiving the boss.

* * * * *